Nov. 5, 1968   B. E. ASH   3,408,804
RANDOM LAY IN CABLES
Filed Nov. 30, 1966   2 Sheets-Sheet 1
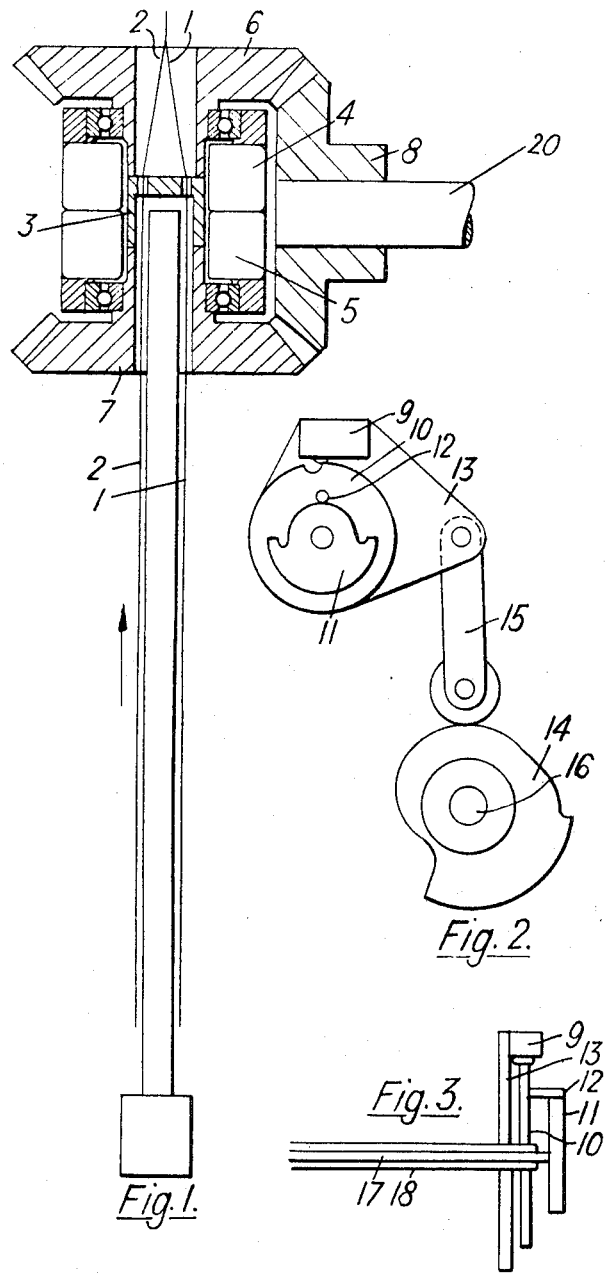
Inventor
BERNARD E. ASH
By Edward Goldberg
Attorney

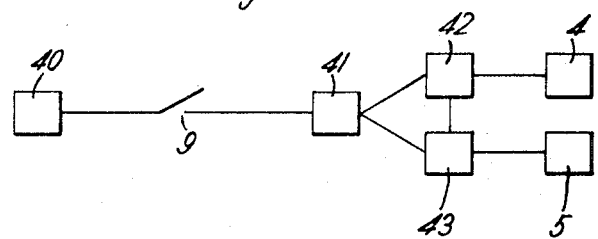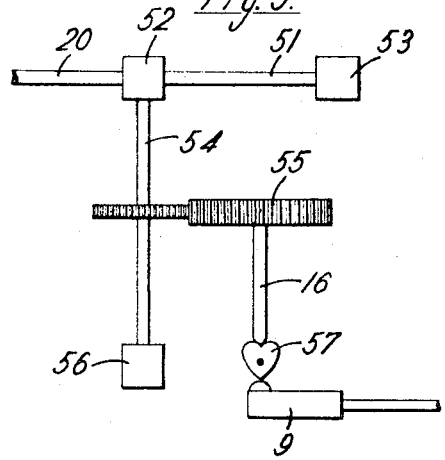

United States Patent Office 3,408,804
Patented Nov. 5, 1968

3,408,804
RANDOM LAY IN CABLES
Bernard Edwin Ash, Bexleyheath, England, assignor to International Standard Electric Corporation, New York, N.Y., a corporation of Delaware
Filed Nov. 30, 1966, Ser. No. 598,026
9 Claims. (Cl. 57—34)

ABSTRACT OF THE DISCLOSURE

Apparatus and method for making a telecommunication cable having twist reversal points including means for changing the direction and angle of lay of the cables and also the point on the circumference of the cable at which the twist reversal occurs. The reversing of the cable lay means is effected by a cam arrangement which acts on means for activating a bistable circuit which in turn acts on a reversing clutch.

---

This invention relates to a method and apparatus for manufacturing telecommunication cables having insulated conductors grouped by twisting them together.

In telecommunication cables having insulated conductors grouped, for example, in pairs or quads by twisting them together, it is advantageous for each group to have a different angle of lay in order to reduce inductive and capacitive disturbances between the groups.

According to the present invention there is provided a method of manufacturing a telecommunication cable having insulated conductors grouped by twisting them together, which comprises the steps of continuously changing the angle of lay at rates selected at random from a range, successively reversing the direction of twist at positions angularly displaced from a datum diameter of the grouped conductors, and varying said angular positions at a rate proportional to the rate of change of the angle of lay.

The invention will now be described with reference to FIGS. 1 to 5 of the accompanying drawings, which illustrate an embodiment of the invention.

Referring now to FIG. 1, which is a cross sectional view of the preferred embodiment, two insulated conducting wires 1 and 2 are drawn at a constant speed in the direction of the arrow and pass through holes in a lay plate 3 which is the driven member of a double electromagnetic clutch comprising coils 4 and 5 and gears 6 and 7. The gears 6 and 7 are driven in opposite directions by a bevel gear 8, which in turn is driven via a shaft 20 through a variable ratio gear box (not shown in FIG. 1). The ratio of the gear box is continuously changed in alternate directions between selected units at a succession of rates the values of which are selected at random from a range. The way in which this is achieved is described in U.S. Patent No. 3,140,577, issued July 14, 1964, and assigned to the same assignee as the instant application. Briefly, an input shaft 51 (FIG. 5) of the gear box is driven by a motor 53 at a constant speed directly proportional to that at which the conducting wires 1 and 2 are drawn through the lay plate 3. A ratio control shaft 54 of the gear box is driven via gears 55 by a pilot motor 56 at randomly selected speeds in either one of two opposite directions, each of these speeds being maintained for a constant time period. Hence the speed of the lay plate is changing at a constant rate during any one time period. This constant rate is randomly selected for each time period. It follows, since the instantaneous angle of lay of the conducting wires is proportional to the instantaneous speed of the lay plate (the speed of the wires in the direction of the arrow being constant), that the rate of change of angle of lay varies in a random manner.

Referring now to FIGS. 2 and 3, a plate 11 is mounted on a rotatable shaft 17 which is driven via further gears (not shown) by the lay plate 3 (FIG. 1). Hence the angular displacement of the plate 11 is proportional to the angular displacement of the lay plate 3. Two projections of the plate 11 co-operate with a pin 12 mounted on a switch cam 10 which is coupled to a bearing sleeve 18 on the shaft 17. Rocking of the switch cam 10 by the pin 12 operates a switch 9 mounted on a carrier plate 13 which is free to rotate about the bearing sleeve 18.

Operation of the switch 9 triggers a suitable bistable electrical circuit, which in one of its two conditions controls electrical switches to complete the energising circuit of one of the coils 4 and 5 (FIG. 1) and break the energising circuit of the other one of the coils, and vice versa in the other of its two conditions.

The bistable circuit is illustrated in FIG. 4. An electrical current source 40 is coupled via the switch 9 to a binary device 41. The coils 4 and 5 are coupled to the binary device 41 via a bistable arrangement 42, 43.

The carrier plate 13 is coupled by a cam sheave 14 carried on a shaft 16 which is driven by or together with the ratio control shaft of the variable ratio gear box, as shown in FIG. 5. The cam arrangement of FIG. 2 between the shaft 16 and the switch 9 is represented by 57 in FIG. 5. The shape of the cam 14 is such that the angular position of the switch 9 varies at a rate proportional to the rate of change of angle of lay of the insulated wires. The total rise of the cam 14 is such that the maximum angular movement of switch 9 corresponds to one complete turn of the lay plate 3.

For an understanding of the operation of the preferred embodiment, let it be supposed that initially the coil 4 is energised, so that the lay plate 3 is attracted into coupling with the gear 6 and turns with that gear, twisting the insulated wires together as it turns. The plate 11 turns with the lay plate 3 and one of its projections engages with the pin 12, causing the switch cam 10 to rotate so that it operates the switch 9. The position at which this occurs depends on the angular relationship between the switch 9 and the cam 10.

Hence the angular position at which the switch 9 is operated varies at a rate proportional to the rate of change of angle of lay. When the switch 9 is operated, the bistable circuit is operated to change its condition, so that coil 4 is de-energised and coil 5 is energised instead. Thus, the lay plate 3 is now attracted to gear 7, and turns with that gear in a direction opposite to the previous one, so that the direction of lay is reversed, and the wires are twisted in this reverse direction until the switch 9 is again operated. Thus the direction of lay is reversed at angular positions which vary at a rate proportional to the rate of change of angle of lay. The group of wires produced in this way is such that both the angle of lay and the angular position of the point of reversal of the lay are randomly distributed.

It is to be understood that the foregoing description of specific examples of this invention is made by way of example only and is not to be considered as a limitation on its scope.

What we claim is:

1. A method of manufacturing a telecommunication cable having insulated conductors grouped by twisting them together, which comprises the steps of continuously changing the angle of lay at rates selected at random from a range, successively reversing the direction of twist at positions angularly displaced from a datum diameter of the grouped conductors, and varying said angular positions at a rate proportional to the rate of change of the angle of lay.

2. A method as claimed in claim 1, wherein twisting of the wires is effected by a lay plate, and including varying the angle of lay by drawing the wires at constant speed through the lay plate while continuously varying the speed of rotation of the lay plate.

3. A method as claimed in claim 2, wherein the direction of twist is reversed by the operation of a switch actuating member, and including varying the angular position of said member at a rate proportional to the rate of change of the angle of lay, and intermittently connecting said member to said lay plate to be driven thereby.

4. Apparatus for manufacturing a telecommunication cable having insulated conductors grouped by twisting them together, which comprises means for changing the angle of lay at rates selected at random from a range, means for successively reversing the direction of twist at positions angularly displaced from a datum diameter of the grouped conductors, and means for varying said angular positions at a rate proportional to the rate of change of angle of lay.

5. Apparatus as claimed in claim 4, wherein said means for changing the angle of lay comprises a lay plate, and includes means for drawing the conductors through said lay plate at a constant speed, means coupled to said drawing means for rotating said lay plate including a continuously variable ratio gear box and means for continuously varying said ratio between predetermined limits.

6. Apparatus as claimed in claim 5, wherein said reversing means comprises a clutch operable to couple said lay plate to said gear box in either one of two directions of rotation.

7. Apparatus as claimed in claim 6, wherein said clutch is an electromagnetic clutch and comprises two gears rotatable in opposite directions and two coils each for magnetically coupling the lay plate to an individual one of the gears, and wherein said means for successively reversing the angle of twist comprises a bistable circuit which in each condition makes the energising circuit of one of the coils and breaks the energising circuit of the respective other one of the coils.

8. Apparatus as claimed in claim 7, which comprises a switch actuating member for operating said bistable circuit, means for varying the angular position of said member at a rate proportional to the rate of change of angle of lay, and a switch cam intermittently driven by the lay plate for operating said member.

9. Apparatus as claimed in claim 8, wherein said means for varying the angular position of said member comprises a cam sheave coupled to the continuously variable ratio gearbox in such a manner that the position of said sheave corresponds to the instantaneous speed of the lay plate, and wherein the angular position of the member is determined by the shape of said sheave.

References Cited

UNITED STATES PATENTS

| 2,790,299 | 4/1957 | Gillis et al. | 57—51 |
| 2,869,316 | 1/1959 | Lilly | 57—64 XR |
| 3,025,656 | 3/1962 | Cook | 57—34 |
| 3,052,079 | 9/1962 | Henning | 57—34 |
| 3,133,402 | 5/1964 | Zwolinski et al. | 57—34 |
| 3,169,360 | 2/1965 | Corral et al. | 57—34 |
| 3,187,495 | 6/1965 | Christian | 57—34 |
| 3,253,397 | 5/1966 | Gillis | 57—34 |

FRANK J. COHEN, *Primary Examiner.*